May 6, 1952     G. C. PARSONS     2,595,603
DUMP VALVE
Filed Jan. 31, 1948
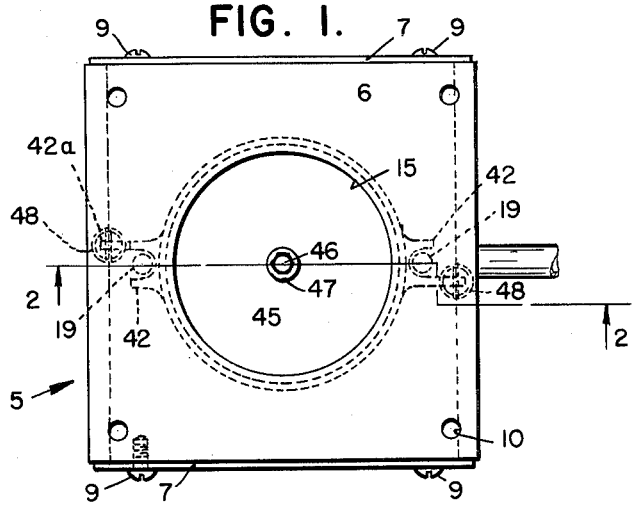
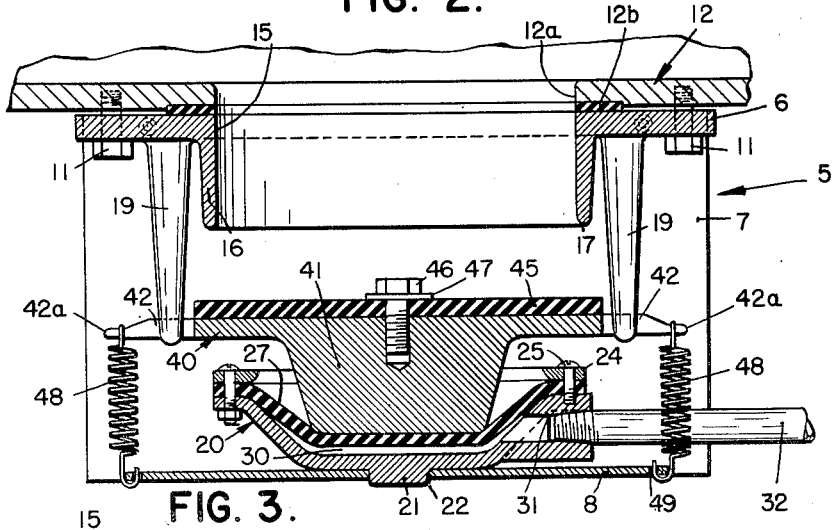
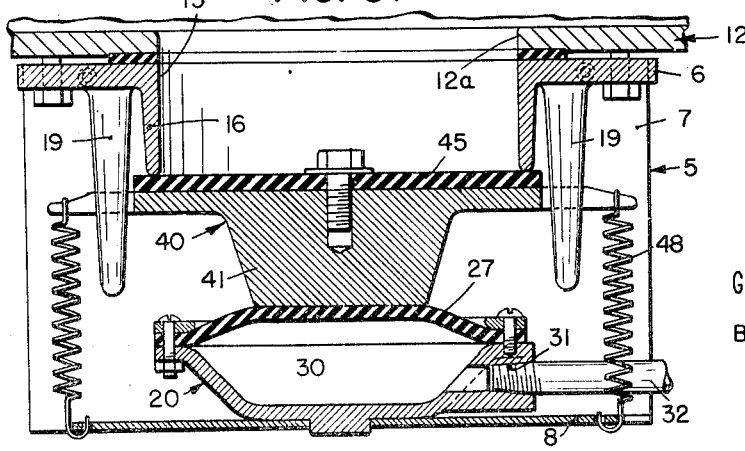
INVENTOR
GEORGE C. PARSONS
BY *Mason & Graham*
ATTORNEYS Patented May 6, 1952

2,595,603

UNITED STATES PATENT OFFICE 2,595,603

DUMP VALVE

George C. Parsons, San Pedro, Calif.

Application January 31, 1948, Serial No. 5,601

2 Claims. (Cl. 137—139)

My invention has to do with dump valves, having as an object the provision of a valve adapted to be connected to a tank or the like, in communication with the outlet thereof, and operable to quickly discharge the contents of the tank.

Another object is to provide a valve of this character which is extremely simple and economical of construction, being composed of a minimum of parts.

In many types of equipment, such as laundry equipment, the water or other liquid in the tanks frequently carries foreign matter such as pins, matches, string, lint, hairpins, et cetera, which tend to become lodged in and clog the ordinary type of dump valve. It is therefore a further and important object of my invention to provide a dump valve which is so constructed as to prevent being clogged by such foreign matter.

Another object is to provide a dump valve which may be quickly operated from a remote point.

Still further objects and advantages will appear from the following description of a presently preferred embodiment thereof, for which purpose I shall refer to the accompanying drawings, wherein:

Fig. 1 is a top plan view;

Fig. 2 is an enlarged section taken on line 2—2 of Fig. 1, showing the valve in open position; and Fig. 3 is a view like Fig. 2 except that the valve is shown in closed position.

The moving elements of the valve are contained in an open sided housing 5 which has a top wall 6, end walls 7 and a bottom wall 8. In the embodiment illustrated, the end and bottom walls are made integral, or as a unit, and suspended from the top wall by the end walls being secured thereto as by screws 9. By this construction of the housing the sides of the housing are open for the passage of liquid released by the valve elements to be described, which liquid is somewhat confined by the side walls to two lateral streams which wash over the valve gasket to free it of any foreign matter tending to lodge thereon.

The top wall has holes 10 to pass screws 11 by which the device is attached to a tank or the like indicated at 12 around the outlet opening 12a in such a tank, a packing ring 12b preferably being interposed between the tank and top wall.

The top wall 6 has a medial opening 15, the bottom portion of which is defined by a cylindrical sleeve-like depending flange 16, the bottom end 17 of which provides a narrow downwardly facing annular valve seat. Also a pair of diametrically opposite guide fingers 19 depend from the top wall adjacent the flange.

The bottom wall supports a dish-shaped receptacle 20 which has a boss 21 fitting into a recess 22 in the bottom wall, and clamped against the flanged top peripheral portion of the receptacle, as by a ring 24 and screws 25, there is a flexible diaphragm 27, the diaphragm preferably being made of rubber or the like.

The diaphragm and receptacle cooperate to provide a fluid chamber 30, the receptacle being provided with an internally threaded passageway 31 into which a pipe 32 screws to introduce and release fluid. The pipe, of course, communicates through suitable control valves with some source of fluid under pressure as well as with atmosphere for release purposes. The fluid used may be either air or liquid.

A weighted gasket mount 40 has a heavy depending boss 41 which rests loosely against the diaphragm 27 and has diametrically opposite pairs of bifurcations 42 between each pair of which loosely extends one of the guide fingers 19. Element 40 is preferably made sufficiently heavy to cause it positively to move downwardly by gravity when the fluid pressure in chamber 30 is released, thereby collapsing the diaphragm.

A flat gasket 45 is carried atop the mount 40, being secured thereto as by a screw 46 and washer 47.

While not always necessary, I may insure more positive and rapid opening of the valve by employing coil springs 48, each of which is looped at one end about an extension 42a of one of the bifurcations and is hooked at its bottom end in a hole 49 in the bottom wall. These springs urge the gasket mount into position collapsing the diaphragm.

In operation the valve is closed (the parts moved from the position of Fig. 2 to the position of Fig. 3) by introducing fluid under pressure into the chamber 30 through the pipe 32, which pipe is, of course, equipped with a suitable conventional control valve not shown. In practice I find that tap water may be satisfactorily used as the fluid medium because the tap pressure in most city water supply systems ranges from 25 to 100 pounds per square inch, which is usually sufficient to maintain the valve closed against the hydrostatic pressures prevailing in most tanks. As the chamber 30 is filled, the element 41 and its carried gasket 45 are raised until the gasket has sealing engagement against the annular seat 17.

Inasmuch as the gasket mount merely rests loosely upon and is unattached to the diaphragm, the gasket, in moving upwardly into closing position, tends to rock into position against the narrow continuous seat 17 as the chamber 30 fills with fluid, so that it finds its ideal seating position. If there should be any foreign matter lodged on the seat, it does not prevent the gasket from seating elsewhere around the seat and it does not cause jamming of the elevating mechanism.

Upon release of fluid pressure from the chamber, the element 41 and the gasket drop under the influence of their weight, plus the pressure in the tank being drained, and plus the pressure of the springs when used, which permits the liquid to pass from the tank, through the flange 16. The gasket 45 acts as a baffle for the liquid since it is normal to the direction of the flow. The liquid thus flows over the top surface of the gasket, washing it free of any foreign matter tending to lodge thereon and keeping it clear for the next closing operation. The end and bottom walls cause the outflowing liquid to move in defined lateral streams so that it may be conveniently collected if desired.

This structure is conducive to permitting the use of extremely large and variously shaped orifices, it not being at all necessary that the outlet orifice defined by the opening 15 and flange 16 be of round cross-section. No close tolerances are required in the manufacture and not only is the valve very economical of manufacture but it requires hardly any maintenance service.

I claim:

1. A dump valve comprising a body having top, bottom and end walls and open at its opposite sides, the top wall having a discharge orifice presenting a downwardly facing annular valve seat, a medially weighted, flat-topped gasket mount, a flat sealing gasket carried atop said mount for sealing engagement with said seat, the bottom wall of the body presenting a medial upwardly opening recess, a receptacle whose bottom wall has a depending boss fitting in said recess, a flexible diaphragm carried by the receptacle, said diaphragm providing a support for the gasket mount and forming with the receptacle a fluid chamber, and means for supplying fluid under pressure and releasing it from said chamber.

2. A dump valve for a container characterized by its economy of construction and assembly, comprising a top plate adapted for attachment around an outlet orifice in said container, said top plate having a medial outlet opening and a depending annular flange around said opening providing an annular valve seat; a bottom plate having a medial recess, end walls securing said plates in spaced parallel relationship and defining side outlets, guide fingers depending from the top plate, a dish-shaped member having a bottom projection fitting in said recess, a flexible diaphragm secured in covering relationship to said member and forming therewith a fluid chamber, fluid pressure applying and releasing means operatively associated with said chamber, a gasket mount having a medial depending weighted portion resting upon and unattached to said diaphragm, and having peripherally projecting bifurcations cooperating with said guide pins, and a gasket secured to the top surface of said gasket mount for closing engagement with the valve seat when fluid pressure is applied to said chamber.

GEORGE C. PARSONS.

REFERENCES CITED

The following references are of record in the file of this patent:

UNITED STATES PATENTS

| Number | Name | Date |
|---|---|---|
| 668,766 | Bickel | Feb. 26, 1901 |
| 943,426 | Lebenberg | Dec. 14, 1909 |
| 2,013,853 | Ray | Sept. 10, 1935 |
| 2,055,031 | Hutchings | Sept. 22, 1936 |
| 2,196,977 | Campbell | Apr. 16, 1940 |
| 2,382,562 | Harvey | Aug. 14, 1945 |
| 2,443,816 | Davis | June 22, 1948 |